(12) United States Patent
Balint et al.

(10) Patent No.: US 7,811,497 B2
(45) Date of Patent: Oct. 12, 2010

(54) MULTI-COLOR INJECTION MOLDED DOOR PANEL AND PROCESS

(75) Inventors: Gregory J. Balint, Windsor (CA); Peter J. Wolters, Kingsville (CA)

(73) Assignee: Johnson Controls Technology Company, Holland, MI (US)

( * ) Notice: Subject to any disclaimer, the term of this patent is extended or adjusted under 35 U.S.C. 154(b) by 1619 days.

(21) Appl. No.: 10/506,852

(22) PCT Filed: Jun. 24, 2004

(86) PCT No.: PCT/US2004/020257

§ 371 (c)(1),
(2), (4) Date: Sep. 3, 2004

(65) Prior Publication Data

US 2005/0285303 A1     Dec. 29, 2005

Related U.S. Application Data

(60) Provisional application No. 60/480,966, filed on Jun. 24, 2003.

(51) Int. Cl.
*B29C 45/16* (2006.01)
*B29C 45/04* (2006.01)
*B29C 45/10* (2006.01)

(52) U.S. Cl. ...................................... 264/255; 425/577

(58) Field of Classification Search ....................... None
See application file for complete search history.

(56) References Cited

U.S. PATENT DOCUMENTS

| | | | |
|---|---|---|---|
| 3,122,598 A | 2/1964 | Berger | |
| 3,363,039 A | 1/1968 | Nagai et al. | |
| 3,788,794 A | 1/1974 | Hehl | |
| 3,807,920 A | 4/1974 | Aoki | |
| 4,014,972 A | 3/1977 | Rentz | |
| 4,275,030 A | 6/1981 | Mares | |
| 4,315,724 A | 2/1982 | Taoka et al. | |
| 4,405,539 A | 9/1983 | Schulte et al. | |
| 4,535,014 A | 8/1985 | Wright | |
| 4,622,712 A | 11/1986 | Sugita et al. | |
| 4,682,943 A | 7/1987 | Schomblond | |
| 4,743,121 A | 5/1988 | Takagi et al. | |
| 4,748,796 A * | 6/1988 | Viel | 53/411 |
| 4,874,654 A | 10/1989 | Funaki et al. | |

(Continued)

FOREIGN PATENT DOCUMENTS

JP     S62-51410     6/1997

*Primary Examiner*—Monica A Huson
(74) *Attorney, Agent, or Firm*—Dobrusin & Thennisch PC

(57) ABSTRACT

A tool for manufacturing a multi-colored plastic automotive part, such as a door panel, is manufactured using multiple molding shots without opening the mold between each shot. The door panel comes out finished with no scuffing, warping, or shrinkage. The process for manufacturing the panel includes selectively locating spacers within the tool to a first position and then injecting a first material. The parting line is held closed while the spacers are then advanced to a second position so as to set the inner insert to a desired second shot wall thickness position. A second shot of material is then introduced into the rear of the injection unit through an opening in the first shot part. The process can be repeated for additional colors and materials to create a multi-colored or even multi-material final assembly. Once the part is cured, it is ejected and the process is complete.

28 Claims, 6 Drawing Sheets

SECOND SHOT POSITION

U.S. PATENT DOCUMENTS

| | | |
|---|---|---|
| 4,902,214 A | 2/1990 | Min et al. |
| 4,923,657 A | 5/1990 | Gembinski et al. |
| 5,007,822 A | 4/1991 | Hara et al. |
| 5,251,954 A * | 10/1993 | Vande Kopple et al. ..... 296/192 |
| 5,595,799 A | 1/1997 | Beck et al. |
| 5,736,221 A * | 4/1998 | Hardigg et al. ............. 428/116 |
| 6,123,889 A | 9/2000 | Katagiri et al. |
| 6,726,868 B1 * | 4/2004 | Panfili et al. ................ 264/247 |
| 7,070,724 B2 * | 7/2006 | Nakazawa .................. 264/250 |

* cited by examiner

FIRST SHOT POSITION

FIRST SHOT POSITION

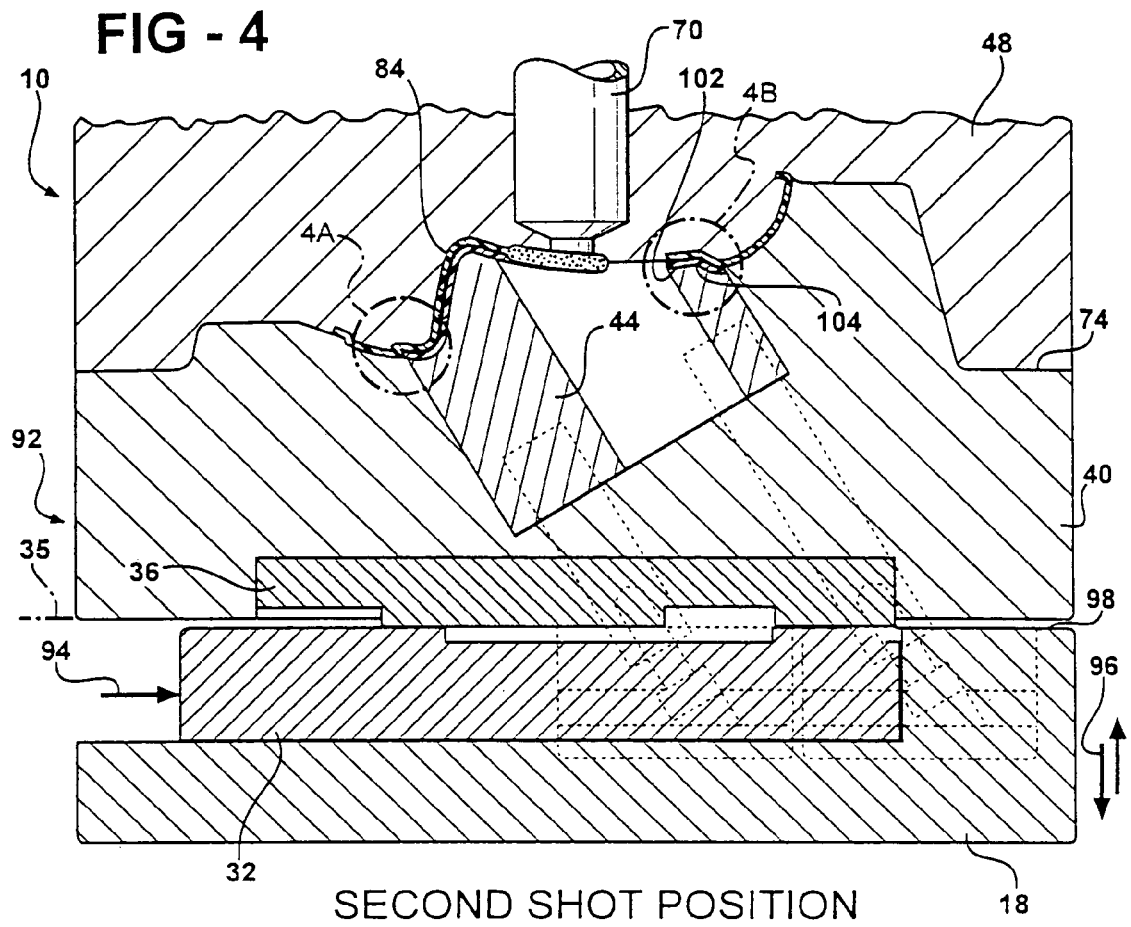
FIG - 4
SECOND SHOT POSITION
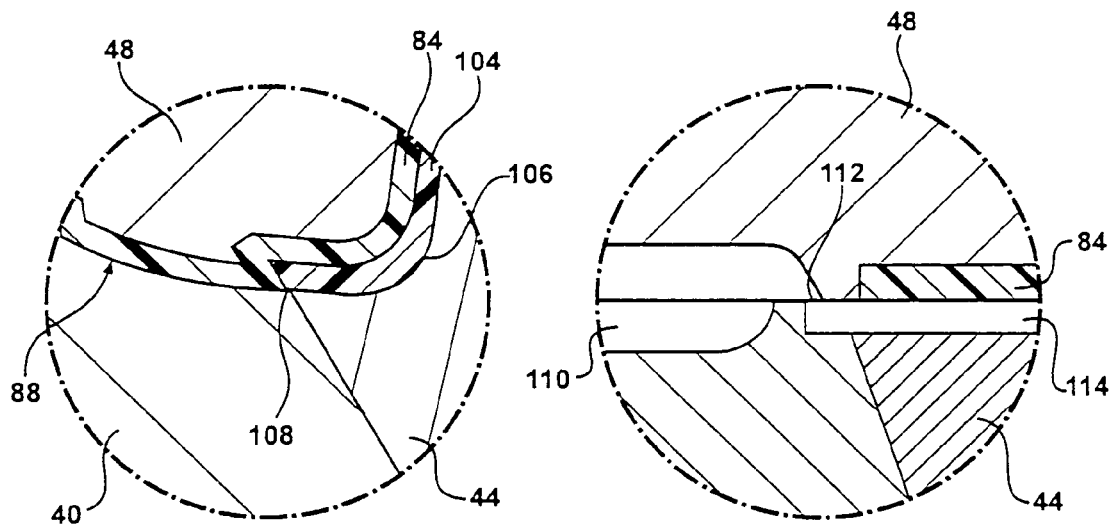
FIG - 4A　　　　FIG - 4B

MULTI-COLOR INJECTION MOLDED DOOR PANEL AND PROCESS

CROSS-REFERENCE TO RELATED APPLICATIONS

This application is a National Stage of International Application No. PCT/IB2004/003067, filed Jun. 24, 2004 which claims priority to Patent application Ser. No. 60/480,966 filed on Jun. 24, 3003.

FIELD OF THE INVENTION

The present invention relates generally to a process of molding a plastic part comprised of more than one material, and to an injection molding tool for making a part such as but not limited to a door panel that is made with multi-colored or multi-material parts.

BACKGROUND AND SUMMARY OF THE INVENTION

It is well known to use the process of injection molding for creating plastic parts that are used in the automotive industry. Typical molding processes will use a single-colored plastic part that has consistent coloring throughout the entire part. Interior automotive components, such as door panels, traditionally use one color throughout the entire door panel. However, the appearance is not aesthetically appealing. Alternatively, door panel assemblies were created comprising separate inter-connectible parts having one or more colors that fit together to make a final door panel assembly. However, these conventional practices have problems such as the multiple door panel components not fitting together with a clean fit once the assembly is completed. Thus, it would be desirable to overcome these problems.

One of the previous methods of making a multi-colored part utilizing an injection molding machine required machine tooling that had numerous working parts that were necessary for each step of the color molding process. These machines were capable of injection molding parts that have different materials as well. Other methods of manufacturing multi-colored and multi-material plastic parts utilized large band areas, that is the area separating different portions of the plastic part from the rest of the colored plastic part. The band surrounds each object to be covered differently, but the problem with the band areas is that they inherently create dead spots from which non-reflective areas are created. If a reflective part is desired, it would be undesirable to have these dead spots since it is preferred to maximize reflective areas.

Another method of injection molding plastic parts includes the rotary method where the mold is rotated between the shot processer so as to create multiple colored parts. However, rotary machines require large tonnage and hence significant capitol investment.

Accordingly, it is desirable to provide a tool for manufacturing multi-colored plastic parts and multi-material plastic parts that reduce scuffing, warpage and shrinkage. It is also desirable to provide a tool for use in injection molding a multi-colored part through a one step process of not opening the mold during the creation of different colored sections of the final part. It is also desirable to provide a tool that is operable to injection mold a part made of multiple materials that can be injection molded in a single process without opening the mold when the different materials are being shot. Thus, it is preferred to maintain the parting line closed which will reduce scuffing, warpage and shrinkage.

One aspect of the invention includes an improved mold having a pair of clamping plates, a cavity block, a core block, an inner-insert mechanism assembly comprised of retainer pins, retainer slides and slide holders, a spacer mechanism, a moving mechanism retainer plate for holding the spacers in place, springs positioned between the core block and the retainer plate, a clamp plate, an ejector retainer plate, an ejector plate, a manifold retainer plate, a manifold plate, a first shot manifold assembly, a second shot manifold assembly, ejector cylinders, a set of full length parallels, and cylinders for advancing the spacers.

It is also desirable to provide a process of manufacturing a multi-colored part, such as a multi-colored door panel, that overcomes the previously mentioned disadvantages. It will be appreciated that said process can be used on a variety of interior and exterior automotive components, and is not limited to the door panel described herein, which is discussed for illustrative purposed only and is not intended to limit the present invention. It is also desirable to provide a process of manufacturing a multi-colored and multi-material part that decreases cycle time, yet increases part quality, and has improved gas removal during the molding process in order to minimize imperfections in the surface of the part. It would also be desirable to provide a process which results in reducing the amount of scrap material. It is also desirable to provide an improved process of manufacturing a multi-colored part that has improved tolerances with a cleaner fit between the various colored and materialed components within the final part.

According to another aspect of the present invention, a process of making a multi-colored injection molded part includes the steps of providing a mold, closing the mold, injecting plastic of a first color into the mold to create a first part, releasing the machine clamp pressure, adjusting a spacer mechanism to offset an inner-insert from the cavity of the first shot, applying tonnage and then injecting plastic of a second color to another part of the mold to create a second part, and opening the mold and ejecting the completed part. The entire process is performed while maintaining the parting line closed.

Another aspect of the present invention includes a multi-colored part, for example a door panel assembly, with a first portion made of a first type of material, for example, of one color, or of one type of material, and a second portion made of a different material or of a different color. The assembly is made through an injection molding process where the parting line of the mold stays closed during the creation of both parts in order to create the final assembly. Thus, shrinkage and warpage issues are minimized, enhancing fit and quality of the final assembly.

For the following specification taken in conjunction with the accompanying drawings, independent claims, other objects, features, and advantages, the present invention will become apparent to those skilled in the art.

BRIEF DESCRIPTION OF THE DRAWINGS

FIG. 4 is an enlarged side view of the spacer mechanism advanced to the right which is the second shot position.

FIG. 4A is an enlarged view taken from the circle 4A of FIG. 4, showing the second shot part relative to the first shot part.

FIG. 4B is an enlarged view taken from circle 4B of FIG. 4 (shown out of position), showing the second shot gate.

DETAILED DESCRIPTION OF THE PREFERRED EMBODIMENTS

Figure 1:
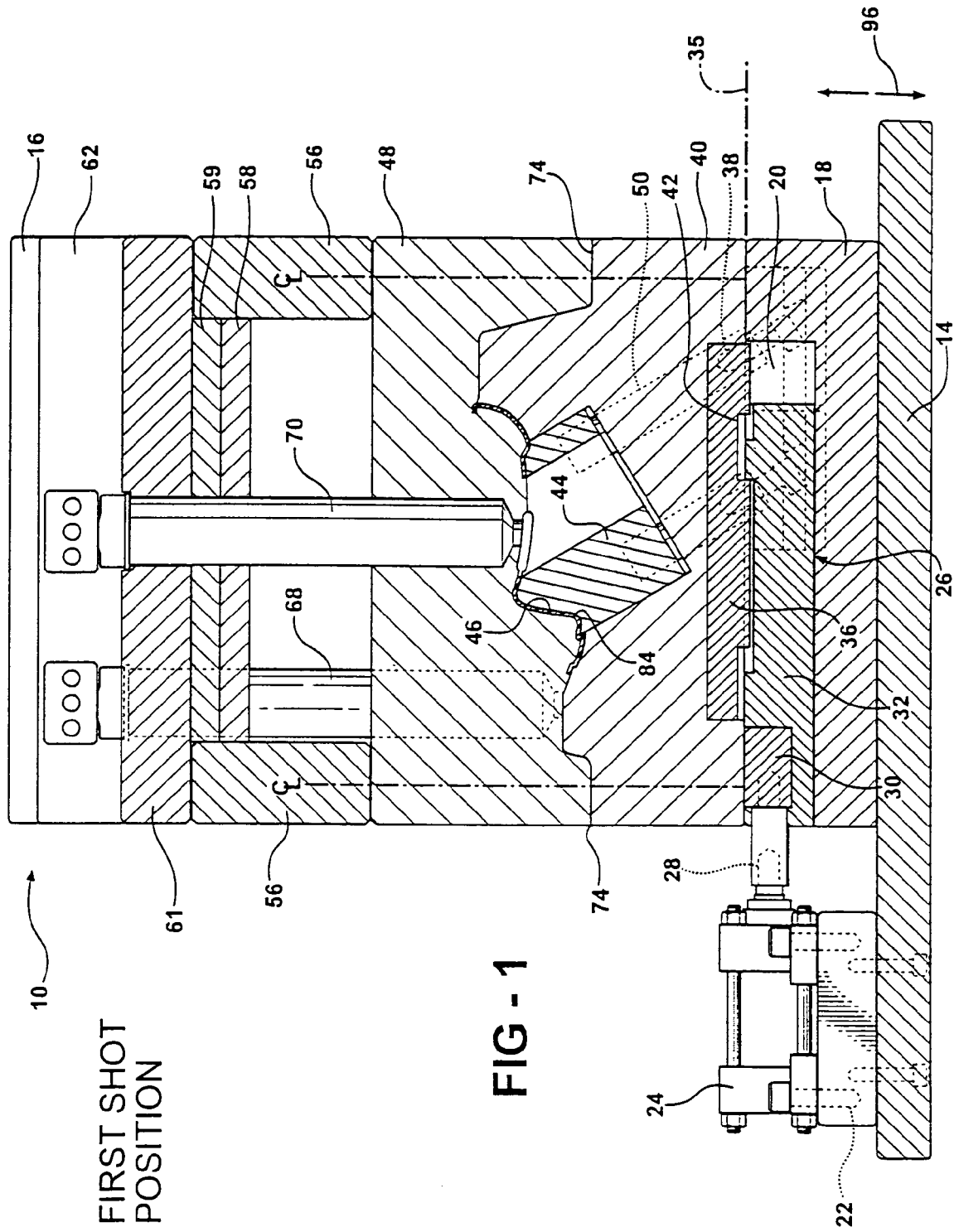
FIG. 1 is a side sectional view of a mold for making a door panel, illustrating the present invention with the spacer and inner-insert assembly, when located in the first shot position.
Figure 6:
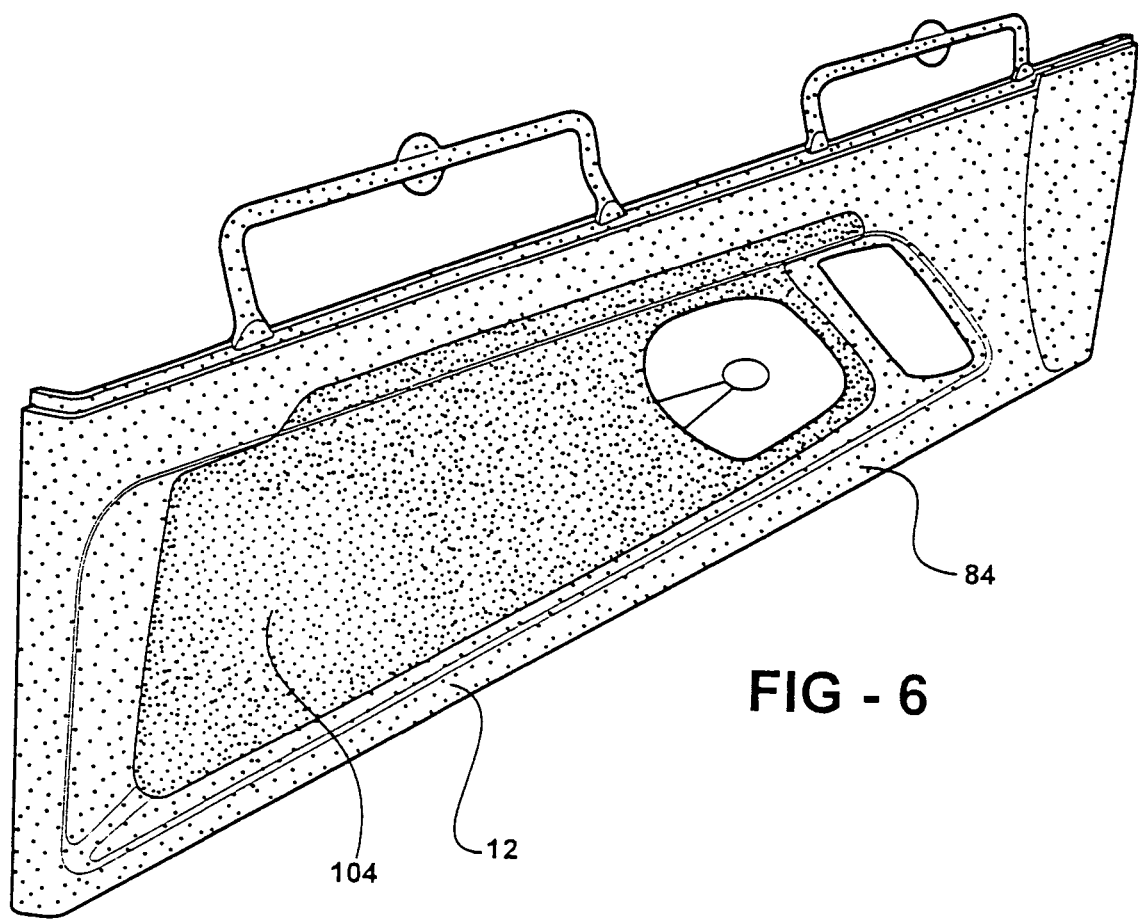
FIG. 6 is a completed two-colored molded door panel utilizing the process of the present invention.

FIG. 1 illustrates an injection molding tool 10 for making a multi-colored or multi-materialed part 12. For illustration purposes only, the following discussion is of a mold 10 for making an automotive door panel 12 which is illustrated in FIG. 6. It will be appreciated that the present invention can be utilized for making a wide variety of components where it is desireable to have a single part comprised of more than one material. It will be appreciated that the materials can be made of polypropylene, polycarbonate, TPO, and others. Moreover, the present invention is operable to make finished parts having multi-colors and/or multiple textures. Further, the present tool allows an operator to run two or more shots without opening the mold during the molding process.

Figure 5:
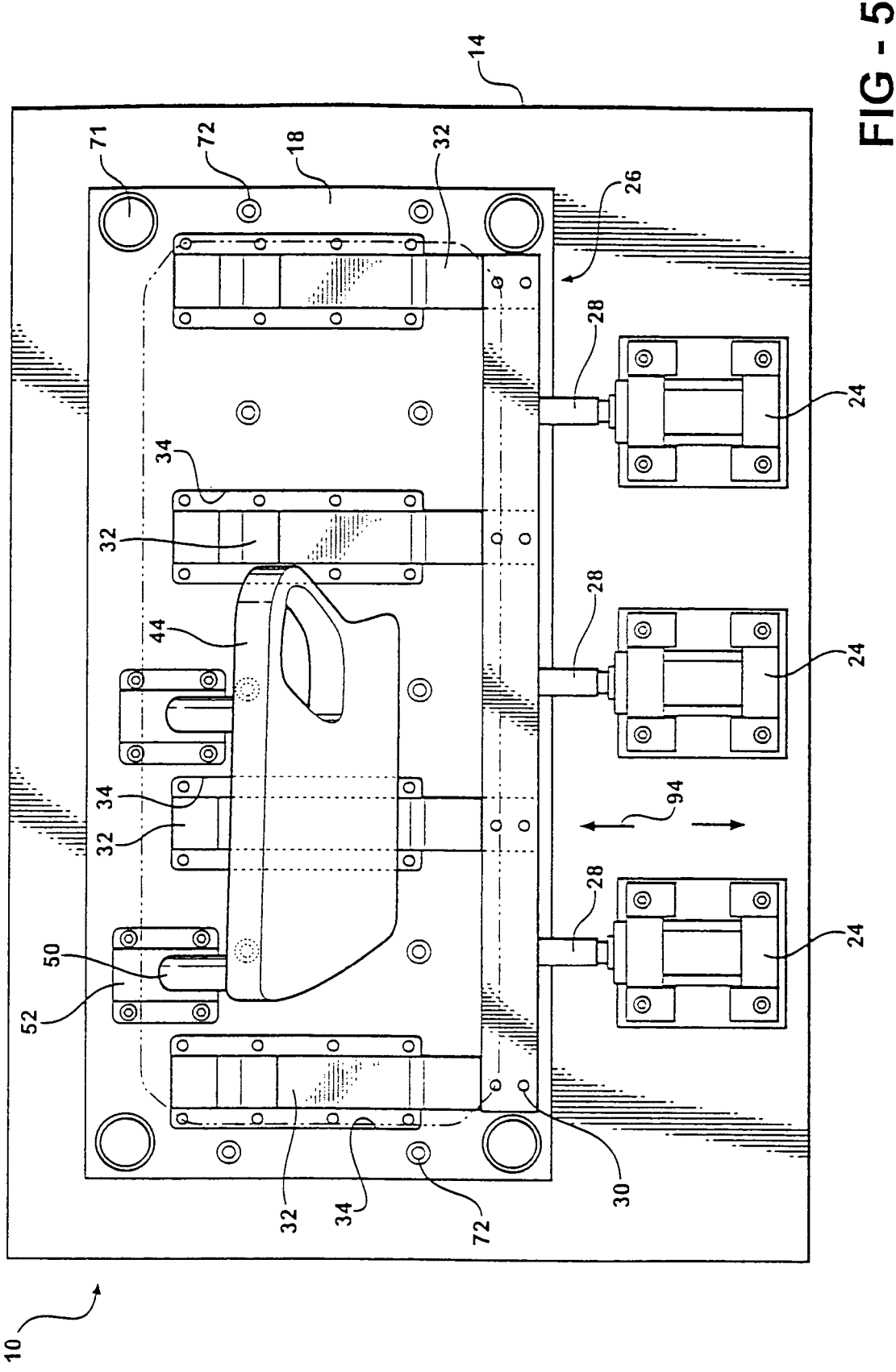
FIG. 5 is a top view of the mold of the present invention showing the spacer mechanisms relative to the hydraulic cylinders, retractor pins and inner insert.

With continued reference to FIG. 1, the injection tool 10 includes a lower clamp plate 14 and an upper clamp plate 16. Affixed to the lower clamp plate 14 is a mechanism retainer plate 18 with a spacer gap 20. A mounting pad 22 is affixed to the lower clamp plate 14 and supports a means for activating a spacer. For example, hydraulic cylinders 24 are secured to the mounting pad 22 and as illustrated in FIG. 5, three separate hydraulic servers 24 are provided for imparting uniform pressure on a spacer mechanism assembly 26. Rod extensions 28 interconnect each hydraulic cylinder 24 to the spacer mechanism assembly 26.

Figure 2:
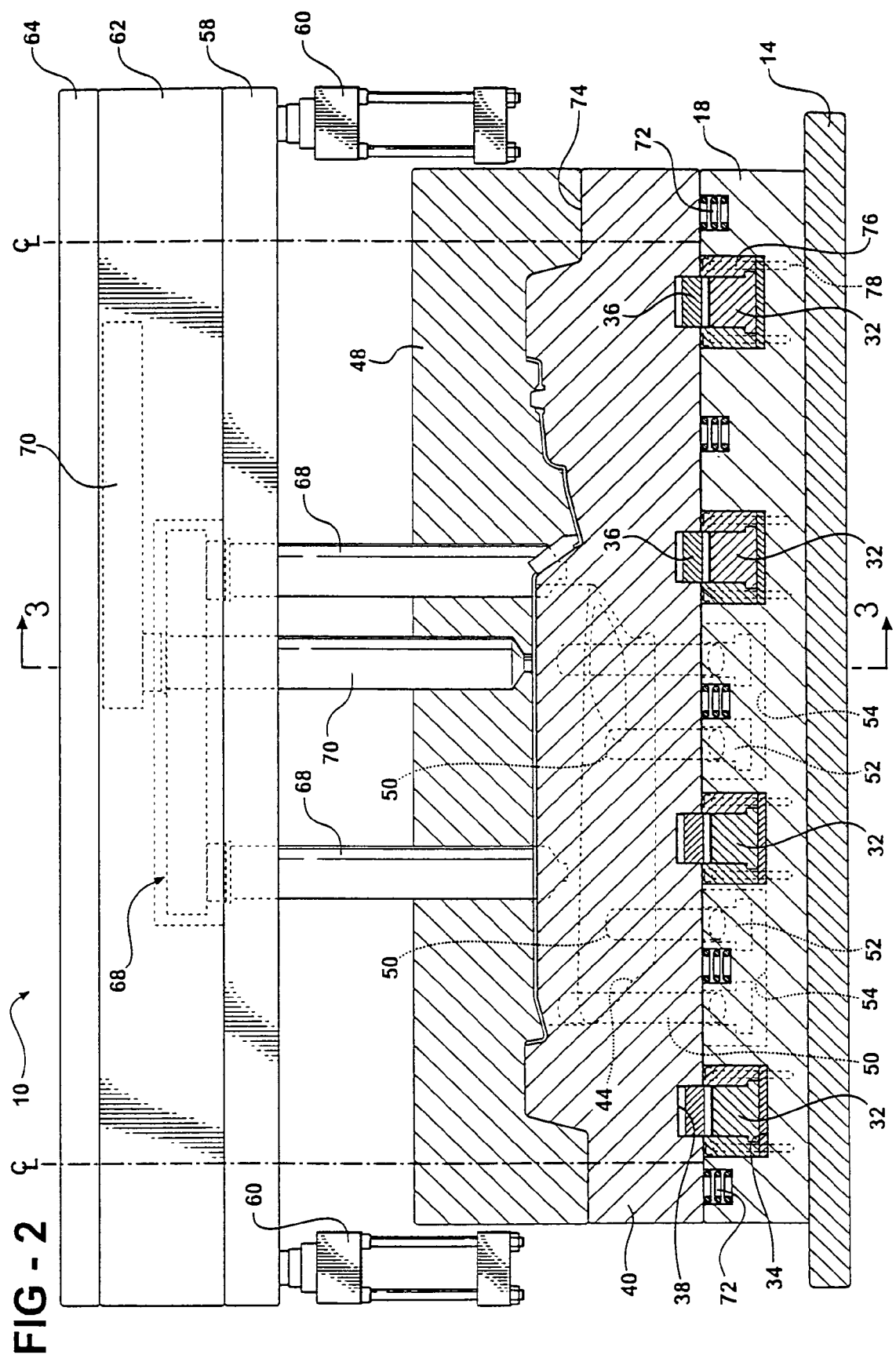
FIG. 2 is a front view section of the figure one mold, illustrating the four spacers and inner-insert assembly, when in the first shot position.

As illustrated in FIGS. 1, 2 and 5, the spacer mechanism assembly 26 includes a driver 30 that is connected to the rod extensions 28 on one side, and to a set of four spacers 32 that traverse within four separate gib assemblies 34 within the mechanism retainer plate 18. Each spacer 32 has a T-shaped portion for sliding within the gib assemblies 34 when the hydraulic cylinders 24 impart motion thereto. A stationery spacer 36 is in each of the locating gib assemblies 34 and stationery spacer 36 is housed within a lower recess 38 of the core 40. The stationery spacer 36 has corners 42 and together the spacers 32 and 36 make metal to metal contact when the spacers 32 advance to the right (second shot position) after the clamp tonnage has been re-applied. Spacer 32 is shown in the first shot position in FIGS. 1 and 3.

The tool 10 further includes a core 40 which is one half of the mold and it receives a retractor or a inner insert 44 with a finished surface 46. The inner insert 44 is positioned at an angle to cause both a vertical and horizontal displacement in order to allow for the space required for the second injection shot. The inner insert mechanism assembly 44 is the part of the mold that the plastic is injected against in order to create a part, and in this instance, the part is an automotive interior door panel. The inner insert mechanism assembly 44 includes four retainer pins 50, four retainer slides 52 and four slide holders 54. The insert assembly 44 is secured to the moving mechanism retainer plate 18 while the core 40 moves relative thereto. This arrangement allows the spacer mechanisms 32 to slide relative to the moving mechanism retainer plate 18.

With reference to FIG. 2, the tool 10 further includes a set of parallels 56 positioned above the cavity block 48, an ejector retainer plate 58, an ejector plate 59, a set of ejector cylinders 60, a manifold plate 62 and a clamp plate 64. The ejector plate 59 and ejector retainer plate 58 are connected through tee slots to the manifold retainer plate 61. The hydraulic ejector cylinders 60 are attached to the ejector plate 58 and they help eject the part 12 when the process is finished (during the ejection stage). The parallels 56 are located on each side of the ejector plate and ejector retainer plate. On one side one parallel is attached to the manifold retainer plate and the opposite parallel is only attached to the manifold retainer plate. The parallel height minus the ejector plate thickness determines the ejector stroke. The empty space within the mold provides the ejection stoke. Within the manifold plate 62 are standard heaters and flow channels that make up a manifold assembly 66 which includes first shot injector nozzle assembly 68 and a second shot injector assembly 70. The material flows from the machine nozzle through the manifold, down the nozzle drops, through the runners and in to the part. The material injected first could be polypropylene and the second could be thermo plastic elastomer (TPE). Heaters surround the outside diameter of the nozzles to keep the plastic in a liquid state until it reaches the runners.

A set of coil springs 72 are positioned within the moving mechanism retainer plate 18 as shown in FIGS. 2 and 5. The springs 72 maintain an upper biasing force against the core block 40 to maintain the parting line 74 closed during the molding process. Maintaining the parting line 74 closed during the first shot and second shot processes is critical to the present invention. It will be appreciated that other means for biasing the core 40 upward, can be contemplated. For example, hydraulic mechanisms can be applied in order to maintain the upper biasing pressure so as to maintain the parting line closed during the molding process. Shifting the mechanical components within the mold while maintaining the parting line closed during the entire injection process, allows for reduced shrinkage, flashing and warpage of the final part 12.

FIG. 2 is a front sectional view of the tool 10 illustrating the various components of the present invention. Each spacer mechanism 32 is shown juxtaposed to gib 34 which in turn is secured to the spacer cavity 34 by fasteners 78.

The tool 10 has three separate nozzles, nozzles 68 for the first shot and nozzle 70 for the second shot. It will be appreciated that the present invention contemplates being operable in environments where more than two colors or more than two different materialed parts can be made, and therefore, additional ejector nozzles are contemplated.

Figure 3:
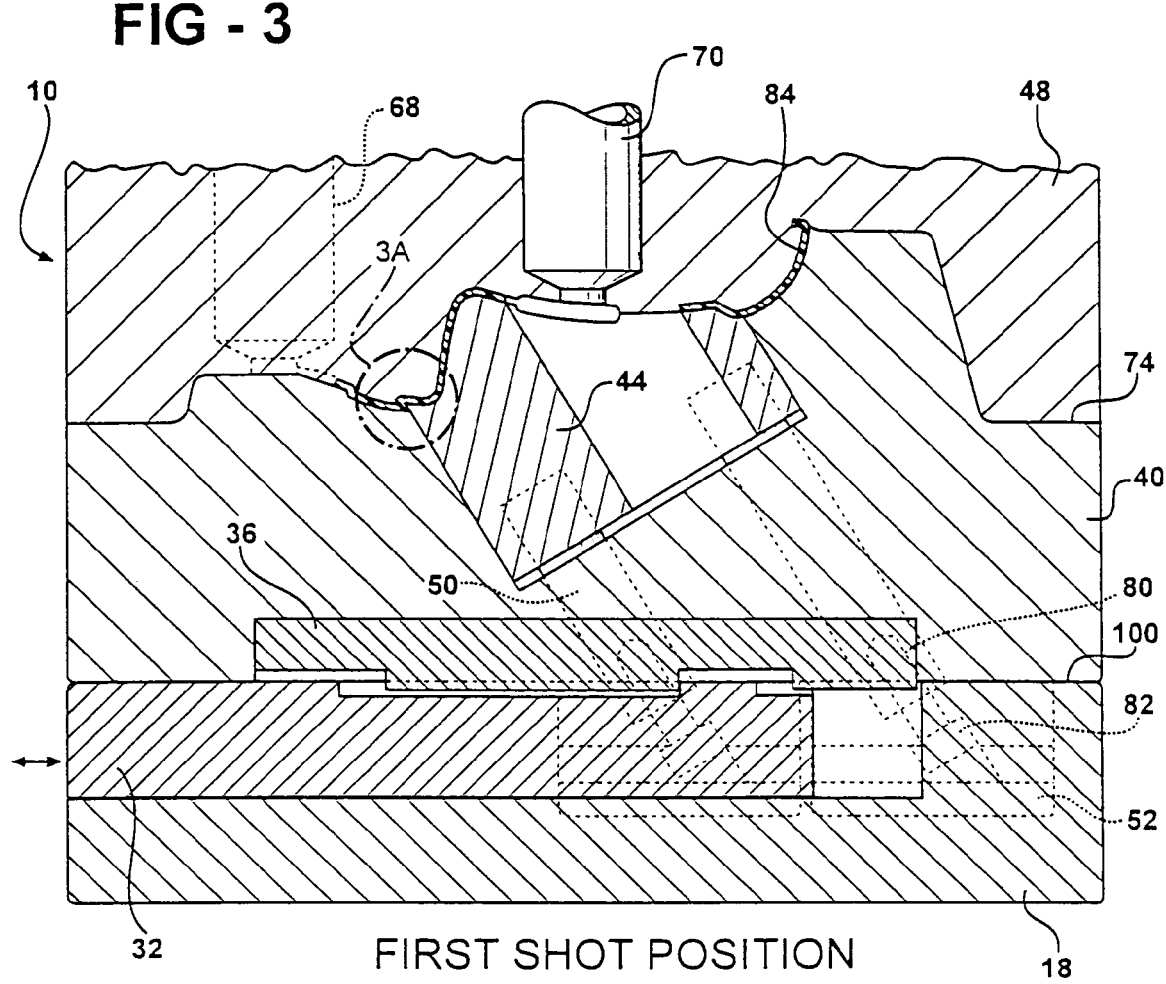
FIG. 3 is an enlarged side view of the spacer mechanism shown in figure one, while in the first shot position.

FIG. 3 illustrates the FIG. 1 embodiment in greater detail where the inner insert assembly 44 has a set of four retainer pins 50, (only two shown in the FIG. 3 side section), wherein at that the distal end 80 of each retainer pin, a bolt 82 is threaded thereto for securing the inner insert 44 to the retainer slide 52. FIG. 3 further illustrates the first shot part 84 after it has been injection molded, with the parting line 74 maintained in the closed position.

Figure 3A:
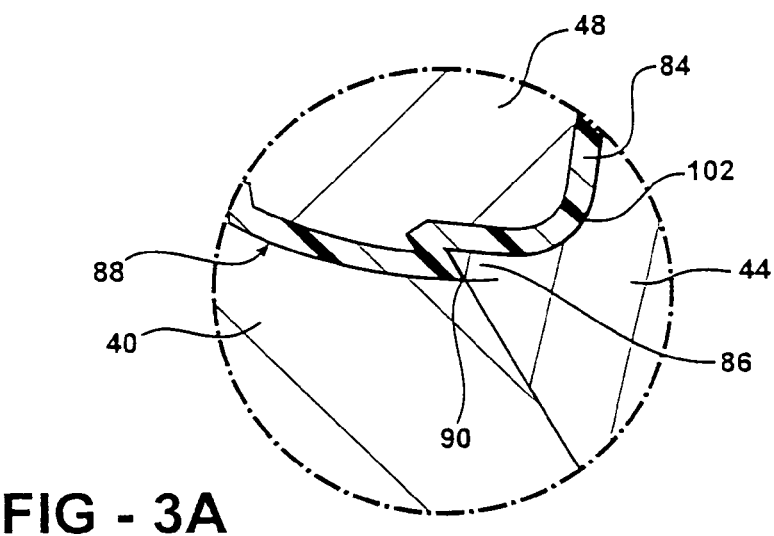
FIG. 3A is an enlarged view taken from the circle 3A of FIG. 3, showing the first shot part relative to the core block, inner insert and cavity block.

FIG. 3A further illustrates the first shot part 84 after the first injection step. A recess 86 provides a void or cavity for the second shot material to be inserted during the second shot process. The outer surface 88 of the first shot part 84 has a butting edge 90 that will mate with a corresponding butting edge of the second shot material. It will be appreciated that overlapping edge designs could be employed as well.

FIG. 4 illustrates the tool 10 in the second shot position 92. This is accomplished by first dumping the clamp tonnage and opening the press to the desired distance which separate spacers 32 and 36. Hydraulic cylinders 24 can now impart motion in the direction of arrow 94 by advancing the spacer mechanism assembly 26. The advancement of the spacer 32 now occurs which allows it to be repositioned under the stationery spacer 36. The press is then closed and the tonnage is then reapplied thus separating core 40 from the mechanism retainer plate 18. This causes a gap split 98 between the core block 40 and the mechanism retainer plate 18. This gap does not occur in the first shot position, as seen at closed split 100 of FIG. 3. Because the inner insert remains stationery, the core block 40 around it shifts the face 102 of the inner insert 44 in an amount equal to the recess which equals the second shot wall thickness as shown in FIG. 3A. This defines the cavity for the second shot material to be injected into during the second shot phase. The clamp tonnage can now be re-applied at approximately 1500 tons.

FIG. 4A illustrates the second shot part 104 after having been injected. It has an exterior finished surface 106 with a well bonded joint 108 or interface that butts up against the corresponding edge 90 of the first shot part 84. The sections essentially fuse together during the molding cycle.

FIG. 4B illustrates in detail the second shot gate configuration. Here the second shot injector 70 injects hot plastic through the runner 110 and then into the gate 112 for dispersion within the cavity 114. Once injected, second shot part 104 is created adjacent to the first shot part 84. The insert assembly 44 is shown relative thereto.

FIG. 5 illustrates a top view of the lower clamp plate 14, the spacer mechanism assembly 26, the moving mechanism retainer plate 18, the four guides 71 and the inner insert assembly 34. The moving mechanism retainer plate 18 is on the moving side of the press and thus shifts when the press is open. A split line 35 opens when the tonnage is dumped and press is opened to a desired height distance. Ten springs 72 extend above a surface of the mechanism retainer plate 18 and (in the uncompressed state) aid in maintaining pressure against the core block 40 so as to maintain the parting line 74 closed relative to the cavity block 48. To return the tool 10 to the first shot position, the tonnage is dumped, the press is opened to the desired distance and then spacer mechanism 32 is shifted in a direction opposite arrow 94 so as to allow the core block 40 to shift in a downward direction to the position illustrated in FIG. 3. This device does not utilize any wedges.

FIG. 6 illustrates a completed part 12 comprised of at least two distinct materials. The first material 84 was injected during the first shot process, and the second material 104 was injected during the second shot process. The completed part 12 has not yet been trimmed or finished and the runners are still showing. It will be appreciated that the door panel 12 could be manufactured utilizing the present process to have more than two different materials or colors by employing the unique closed parting line process.

A description of the process of manufacturing a multi-colored or multi-materialed part utilizing the present invention will now be presented. With reference to FIG. 3, the spacer mechanism 32 is located in the first shot position after the tool 10 has closed. The parting line 74 maintains closure throughout the injection process. The first shot injector nozzle assembly 68 delivers a first material through the cavity block 48 to create a first shot part. The part starts to cool at this step of the process. The stationery cavity block 48 remains closed during this period. Next, the clamp tonnage is dumped and the press is opened to the desired distance. All movement is done by the moving side of the injection machine which is on the lower clamp 14 side of the tool 10. Thus, clamp 14 and mechanism retainer 18 advance downwardly in the direction of arrow 96 (FIG. 4) with the ram when tonnage is dumped. Next, spacer 32 is shifted in place by moving in the direction of arrow 94 (FIG. 4). The press then closes and tonnage is reapplied. A separation or gap 98 then occurs between the mechanism retainer plate 18 and the core block 40 which results in the inner insert 44 to become off-set from the first shot part 84. This off-set clearance 86 (FIG. 3) in part defines the new cavity area for the material of the second shot part 104 to be molded into during the second shot process.

When the core 40 shifts, each biasing spring 72 continues to apply pressure against the core block 40 so as to maintain the parting line 74 closed continuously during the process. The clamp tonnage is now applied to the mold whereby a second set of materials can now be injected through second injector assembly 70 to create a second shot part 104. A well bonded joint 108 is thereby created having a tight fit configuration. Because of the molding process, the two parts are essentially fused thus enhancing the appearance and fit. Once the part 12 cools, the mold is opened and the cylinder ejectors 60 cause the part 12 to be ejected.

Those skilled in the art can now appreciate from the foregoing description that the broad teachings of the closed parting line invention can be implemented in a variety of forms. Therefore, while this invention has been described in connection with a particular example of a door panel, the true scope of the invention should not be so limited, since other modifications will become apparent to the skilled partitioner upon a study of the drawings, specification and following claims.

What is claimed is:

1. A process for making an injection molded part using a press, a cavity block, a moveable core block, a parting line defined at a junction between the cavity block and the moveable core block, at least one injection nozzle, a stationary inner insert and at least one spacer mechanism that is moveable relative to the core, wherein the cavity block and the moveable core block are moveable relative to the stationary inner insert, comprising:
   a) closing the parting line between the cavity block and the moveable core block;
   b) setting at least one spacer mechanism to a first shot position to locate the cavity block and the moveable core block to a first shot position relative to the stationary inner insert;
   c) closing the press to a first shot position;
   d) applying clamp tonnage to the press;
   e) injecting a first quantity of material to create a first portion of the injection molded part while keeping the parting line closed;
   f) releasing the clamp tonnage while keeping the parting line closed;
   g) opening the press to a predetermined position while keeping the parting line closed;
   h) setting at least one spacer mechanism to a second shot position to secure the cavity block and moveable core block in a second shot position relative to the stationary inner insert, while keeping the parting line closed;
   i) closing press to a second shot position while keeping the parting line closed;
   j) reapplying the clamp tonnage to the press while keeping the parting line closed;
   k) injecting a second quantity of material to create a second portion of the injection molded part while keeping the parting line close; and l) opening the press and the parting line and ejecting the completed injection molded part.

2. The process as claimed in claim 1, further comprising positioning the moveable core to first and second positions and other positions relative to the stationary inner insert to create multiple colors or material portions of the injection molded part.

3. The process as claimed in claim 1, further comprising controlling a cycle time of the process.

4. The process as claimed in claim 1, further comprising placing at least one of part inserts of metal or film into a cavity between the cavity block and the moveable core block before closing the parting line.

5. The process as claimed in claim 1, wherein the completed injection molded part has at least two different colors.

6. The process as claimed in claim 1, wherein the completed injection molded part has at least two different materials.

7. The process as claimed in claim 1, wherein the first and second portions of the injection molded part are joined at an interface.

8. The process as claimed in claim 1, wherein the first and second portions of the injection molded part are overlaid.

9. The process as claimed in claim 1, wherein at least one of the at least one spacer mechanism sets a size of a gap for that shot wall thickness for each of a first and second shot wall thickness.

10. The process as claimed in claim 1, wherein the process utilizes four spacer mechanisms usable to position the moveable core in a desired position relative to the stationary inner insert.

11. A method for making an injection molded part using a cavity block, a moveable core block, a parting line defined between the cavity block and the moveable core block, at least one injection nozzle, a stationary inner insert and a set of spacers usable to posit ion the moveable core relative to the stationary inner insert, comprising:
  a) applying clamp tonnage to a mold
  b) injecting a first quantity of material into the mold;
  c) releasing the clamp tonnage from the mold while keeping the parting line
  d) advancing the set of spacers to position the moveable core in a second shot position relative to the stationary inner insert while keeping the parting line closed;
  e) reapplying the clamp tonnage to the mold while keeping the parting line closed; and
  f) injecting a second quantity of material into the mold.

12. The method for making an injection molded part as claimed in claim 11, wherein the set of spacers sets at least one position that a press can be closed to.

13. The method for making an injection molded part as claimed in claim 11, wherein advancing the set of spacers comprises:
  setting the set of spacers to a position that results in a relative change of position between the stationary inner insert and the first quantity of material injected into the mold while keeping the parting line closed.

14. A process of manufacturing a door panel having at least two different portions using a mold having a cavity block, a stationary inner insert and a moveable core block, and a parting line between the cavity block and the moveable core block, at least one injection nozzle, and a spacer mechanism that is moveable relative to the moveable core of the mold while maintaining a parting line of the mold closed until the process is complete, comprising of the steps of:
  a) setting the spacer mechanism to a first shot position such that the moveable core block is located at a first shot position relative to the stationary inner insert;
  b) closing the parting line of the mold;
  c) applying clamp tonnage to the mold;
  d) injecting a first quantity of material while maintaining the parting line of the mold closed to create a first portion of the door panel;
  e) releasing the clamp tonnage while maintaining the parting line of the mold closed;
  f) setting the spacer mechanism to a second shot position such that the moveable core block is located at a second shot position relative to the stationary inner insert while maintaining the parting line of the mold closed;
  g) reapplying the clamp tonnage to the mold while maintaining the parting line of the mold closed;
  h) injecting a second quantity of material while maintaining the parting line of the mold closed to create subsequent portions of the door panel; and
  i) opening the parting line of the mold and ejecting the door panel.

15. The process as claimed in claim 14, wherein the first quantity of material and the second quantity of material have different durometer ratings.

16. The process of claim 14, wherein the first quantity of material and the second quantity of material have different colors.

17. The process of claim 14, wherein at least one of the first quantity of material and the second quantity of material is comprised of soft-touch material.

18. A process of manufacturing an injection molded part using a mold having a cavity block, a stationary inner insert and a moveable core block, wherein the moveable core block is moveable relative to the stationary inner insert, and the cavity block and the moveable core block define a cavity of the mold with a parting line between the cavity block and the moveable core block, at least two injection nozzles and a set of spacer mechanisms that are moveable relative to the moveable core block while keeping a parting line of the mold closed until the process is completed, the process comprising:
  a) injecting into the cavity material forming a first portion of the injection molded part while the set of spacer mechanisms are located in a first position such that the moveable core is located at a first position relative to the stationary inner insert and while keeping the parting line of the mold closed;
  b) while keeping in the parting line of the mold closed, removing a clamp tonnage, opening a press, the press comprising an upper clamp plate and a lower clamp plate, to a predetermined position and re-locating the set of spacer mechanisms to a second position, such that the moveable core is located at a second position relative to the stationary inner insert;
  c) reapplying the clamp tonnage while keeping the parting line of the mold closed;
  d) injecting into the cavity material forming a subsequent portion of the injection molded part while keeping the parting line of the mold closed; and
  f) opening the parting line of the mold and ejecting the injection molded part from the mold.

19. The process as claimed in claim 18, further comprising biasing the moveable core block away from the set of spacers to maintain the parting line of the mold closed.

20. The process as claimed in claim 19, wherein biasing the moveable core block comprises applying a spring force from at least one spring against the moveable core block.

21. A process for making an injection molded part using a mold, the mold including a moveable mold core defining a cavity and having a parting line between multiple parts, a stationary mold insert at partially within the cavity and a press, the process comprising:
   a) moving the moveable mold core to a first position relative to the stationary mold insert to provide room within the cavity for injecting a first quantity of material into the cavity;
   b) closing the parting line of the mold;
   c) applying a clamp tonnage to the mold while maintaining the parting line of the mold closed;
   d) injecting the first quantity of material into the cavity while maintaining the parting line of the mold closed;
   e) releasing the clamp tonnage while maintaining the parting line of the mold closed;
   f) moving the moveable mold core relative to the stationary mold insert to a second position to provide additional room within the cavity for injecting a second quantity of material while maintaining the parting line of the mold closed;
   g) reapplying the clamp tonnage while maintaining the parting line of the mold closed; and
   e) injecting the second quantity of material into the cavity while maintaining the parting line of the mold closed.

22. The process as claimed in claim 21, wherein moving the moveable mold core comprises moving an injection press platen supporting the moveable mold core.

23. The process as claimed in claim 21, wherein moving the moveable mold core is performed without using wedges integral to the mold.

24. The process as claimed in claim 21, wherein the multiple parts of the moveable mold core stay are in physical contact with each other during the molding process to maintain the parting line closed.

25. The process as claimed in claim 21, further comprising biasing the multiple parts of the moveable mold core toward each other to maintain the parting line closed during the process.

26. The process as claimed in claim 21, further comprising moving the moveable core to a further position relative to the stationary mold insert and injecting an additional quantity of material while maintaining the parting line of the mold closed.

27. A system for making an injection molded part comprising:
   a pair of clamp plates;
   a moveable core block;
   a moveable cavity block positionable adjacent to the moveable core block, the moveable cavity block contacting the moveable core block at a parting line;
   a stationary inner-insert positioned at least partially within the moveable core block;
   a spacer mechanism retainer plate;
   a spacer mechanism moveable relative to the spacer mechanism retainer plate and usable to maintain the position of the moveable core block relative to the stationary inner-insert;
   at least one hydraulic cylinder for moving the spacer mechanism while a clamp tonnage is not applied to the mold;
   a set of members located on an upper side of the cavity block;
   a manifold retainer plate located adjacent the members;
   an ejector retainer plate and an ejector plate located on an underside of the manifold retainer plate;
   a first shot manifold assembly disposed within the manifold plate;
   a second shot manifold assembly disposed within the manifold plate; and
   ejector cylinders fixed to the manifold retainer plate.

28. The method of making an injection molded part as claimed in claim 11, wherein applying and reapplying the clamp tonnage to the mold each comprises closing a press against the mold and applying the clamp tonnage to the mold using the press, the method further comprising:
   g) before a) applying the clamp tonnage to the mold; positioning the moveable core block of the mold to a first shot position and closing the parting line of the mold;
   h) after c) releasing the clamp tonnage from the mold; opening the press to a predetermined position while keeping the parting line of the mold closed;
   i) before e) reapplying the clamp tonnage to the mold; positioning the moveable core of the mold to a second shot position while keeping the parting line of the mold closed; and
   j) after f) injecting the second quantity of material into the mold; opening the parting line of the mold and ejecting a completed part.

* * * * *

UNITED STATES PATENT AND TRADEMARK OFFICE
CERTIFICATE OF CORRECTION

PATENT NO. : 7,811,497 B2
APPLICATION NO. : 10/506852
DATED : October 12, 2010
INVENTOR(S) : Gregory J. Balint et al.

It is certified that error appears in the above-identified patent and that said Letters Patent is hereby corrected as shown below:

On the Title Page, Item (86) PCT No.:  Replace [[PCT/US2004/020257]] with --PCT/IB2004/003067--

Signed and Sealed this
Seventh Day of May, 2013

Teresa Stanek Rea
*Acting Director of the United States Patent and Trademark Office*